United States Patent [19]

Yamagata

[11] Patent Number: 4,874,220
[45] Date of Patent: Oct. 17, 1989

[54] VIEWING OPTICAL SYSTEM FOR USE WITH ENDOSCOPE

[75] Inventor: Masakazu Yamagata, Tokyo, Japan

[73] Assignee: Asahi Kogaku Kogyo Kabushiki Kaisha, Tokyo, Japan

[21] Appl. No.: 156,633

[22] Filed: Feb. 17, 1988

[30] Foreign Application Priority Data

Feb. 17, 1987 [JP] Japan ............................. 62-21724[U]

[51] Int. Cl.⁴ .............................................. G02B 23/26
[52] U.S. Cl. .................................. 350/96.26; 350/96.18
[58] Field of Search ............... 350/96.24, 96.25, 96.26; 128/4, 5, 6

[56] References Cited

U.S. PATENT DOCUMENTS

| | | | |
|---|---|---|---|
| 3,666,347 | 5/1972 | Kitano et al. | 350/96.25 X |
| 3,864,017 | 2/1975 | Cole | 350/96.25 |
| 4,487,646 | 12/1984 | Murray et al. | 156/177 |
| 4,529,267 | 7/1985 | Nishioka et al. | 350/96.26 |
| 4,577,926 | 3/1986 | Dewey et al. | 350/96.25 |
| 4,650,279 | 3/1987 | Magee | 350/96.24 |

FOREIGN PATENT DOCUMENTS

| | | |
|---|---|---|
| 56-145997 | 7/1981 | Japan . |
| 58-221809 | 12/1983 | Japan . |
| 62-43604 | 2/1987 | Japan . |

*Primary Examiner*—Frank Gonzalez
*Attorney, Agent, or Firm*—Sughrue, Mion, Zinn, Macpeak & Seas

[57] ABSTRACT

A viewing optical system for use with an endoscope and which permits a substantial reduction in the size of the objective lens system at the object end of the device, making the endoscope more maneuverable. The optical system includes an objective lens unit forming a curved image plane conjugate with the object plane and an optical-fiber image guide having one end surface curved to substantially conform to the image plane.

3 Claims, 4 Drawing Sheets

VIEWING OPTICAL SYSTEM FOR USE WITH ENDOSCOPE

BACKGROUND OF THE INVENTION

The present invention relates to a viewing optical system for use with an endoscope in which light from an object to be examined that is incident upon an objective lens unit is transmitted through an optical-fiber image guide and the resulting focused image is viewed directly with the eye or photographed with a camera.

A prior art viewing optical system for use with an endoscope of the same general type as the present invention is shown in FIG. 1.

An endoscope 1 includes a viewing system 2 composed of an objective lens unit 10 which receives light from an object to be examined under illumination with a lighting optical system (not shown), an optical-fiber image guide 20 that transmits the image of the object focused on the light-receiving end surface 21 via the lens unit 10, and an eyepiece 30 whose focal point coincides with the light-emerging surface 22 of the image guide 20.

The endoscope 1 shown in FIG. 1 is composed of two rigid parts, $A_1$ and $A_2$, and one flexible part B. Each of the objective lens unit 10 and the eyepiece 30 is placed in a rigid holder so as to maintain a predetermined distance between the two lens units and a predetermined positional relationship between the objective lens unit 10 (or eyepiece 30) and the end face 21 (or 22) of the image guide 20. The part of the endoscope between the two rigid parts $A_1$ and $A_2$ is made flexible so that it can be curved to provide easy access to an object of interest through a channel in the body such as the esophagus. The objective lens unit 10 fitted at the tip $1a$ of the endoscope 1 is composed of a concave lens 11, a convex lens 12 and a doublet lens 13. The function of the doublet lens 13 is to transform the curved image plane formed by the concave and convex lenses 11 and 12 to a flat image plane that conforms to the light-receiving end surface 21 of the image guide 20.

The endoscope 1 described above usually is designed in such a way that the operator can manipulate it on the side of the eyepiece 30 to direct the tip $1a$ toward a point in directions other than that in which the endoscope is advancing. A greater freedom in changing directions in a limited space can be attained by reducing the length of the rigid part $A_1$, and this has raised the need to shorten this part.

Attempts have been made to shorten the length of rigid part $A_1$ by employing fewer lens elements in the objective lens unit 10 and by shortening the overall length of this unit. Those approaches, however, have simply resulted in a deterioration of the focusing performance of the objective lens unit 10, and no clear image of the object can been seen through the eyepiece 30.

For instance, if the doublet lens 13 is eliminated from the objective lens unit 10 in the optical system 2 shown in FIG. 1, the image plane formed by the objective lens unit 10 becomes curved and the image of the object formed on the light-receiving end surface of the image guide 20 is not in focus at all points of the image. That is, if focusing is achieved at the center of the image, marginal portions are defocused.

SUMMARY OF THE INVENTION

The present invention has been accomplished in order to solve the aforementioned problems of the prior art.

A principal object of the invention is to provide a viewing optical system for use with an endoscope that has an objective lens unit accomodated in a shorter rigid section and which yet allows viewing of a sharp image of an object being examined.

In order to attain this object, the viewing optical system for use with an endoscope of the present invention is provided with an objective lens unit forming a curved image plane conjugate with an object plane and an optical-fiber image guide having one end surface curved to substantially conform to said image plane.

Having the composition described above, the viewing optical system of the present invention permits the use of a smaller number of lens elements in the objective lens unit, which contributes to a reduction in the length of the rigid part accommodating the lens unit. At the same time, blurring of the image of an object to be examined is reduced to a level that will cause no problem for practical purposes.

DESCRIPTION OF THE PREFERRED EMBODIMENTS

Figure 1:
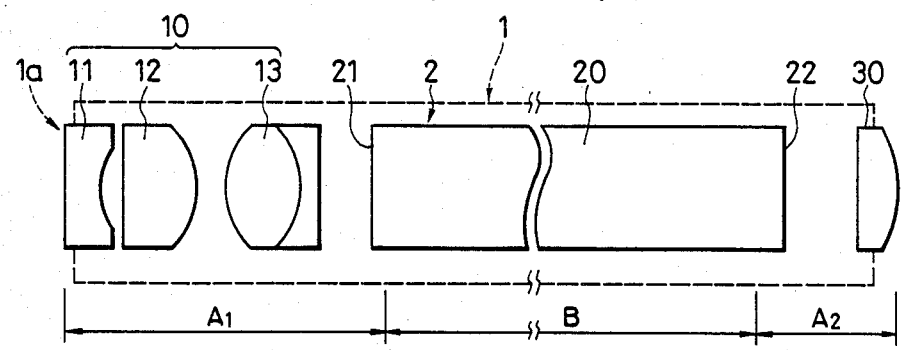
FIG. 1 is a schematic representation of a prior art viewing optical system for use with an endoscope.
Figure 2:
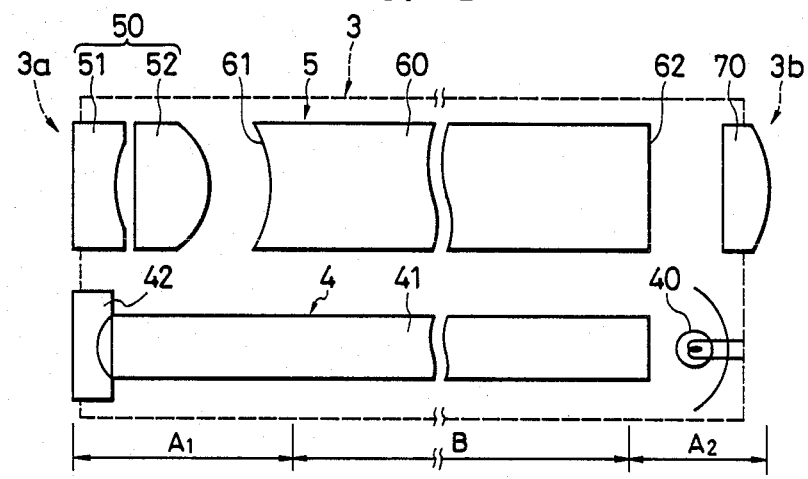
FIG. 2 is a schematic representation of a viewing optical system for use with an endoscope according to a preferred embodiment of the present invention.

The present invention will be described hereinafter with reference to the accompanying drawings, of which FIG. 2 shows a preferred embodiment of a viewing optical system the invention.

As shown in FIG. 2, an endoscope 3 includes two optical systems: a lighting optical system 4 for illuminating an object to be examined and a viewing optical system 5 for viewing the illuminated object. The actual endoscope is equipped with other components such as air- and water-supply tubes, a forceps channel, and angle wires, but for clarity of illustration these are omitted from FIG. 2.

The endoscope 3 is used in such a way that the tip $3a$ is inserted into the interior of a machine or a body organ or cavity or some other area that cannot be directly viewed with the eye, and the operator examines the object of interest with the base portion $3b$. As with the prior art product, this endoscope can be considered as a combination of two rigid parts $A_1$ and $A_2$ and one flexible part B.

The lighting optical system 4 includes a light source 40, a lightguide 41 for guiding the light from the light source 40 to the tip $3a$ of the endoscope 3, and a lens 42 for illuminating the object of interest to provide an efficient distribution of luminous intensity.

As with the prior art product, the viewing optical system 5 includes an objective lens unit 50, an optical-fiber image guide 60 and an eyepiece 70. The objective lens unit 50 is composed of two lens elements 51 (concave lens) and 52 (convex lens), with the light-receiving end surface 61 of the image guide 60 being curved in concave form.

The objective lens unit 50 is composed of two lens elements, and, as already discussed, it forms a curved image plane that is conjugate with the object plane. Therefore, in accordance with the present invention, the light-receiving end surface 61 of the image guide 60 is curved in such a way that it substantially conforms to this curved image plane.

The image guide 60 is typically formed of 20,000 to 30,000 optical fibers about 10 $\mu$m in diameter that are fixed in a side-to side relationship. Such a fiber bundle can be treated as a glass rod. Thus, the light-receiving end 61 of the bundle can be made to have a concave surface by grinding and polishing techniques.

The advantage of providing a curved surface at the light-receiving end surface 61 of the image guide 60 is that it allows the image of an object of interest to be formed on the light-receiving end surface 61 with all points of the image in focus. As a result, a sharp image of the object can be observed through the eyepiece 70, as will be discussed in more detail below.

Figure 3:
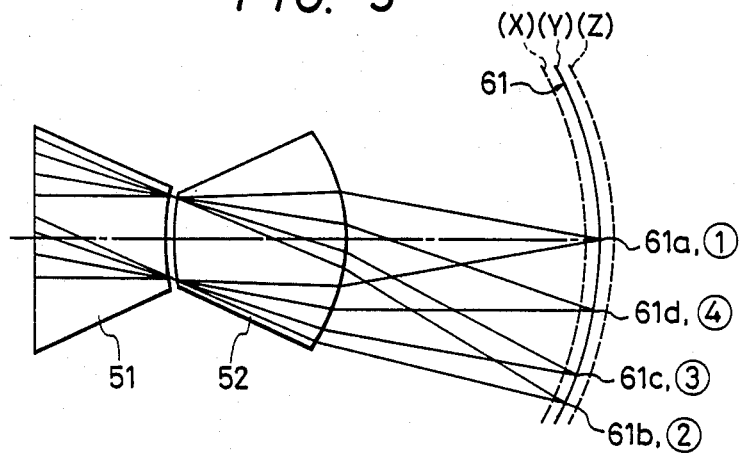
FIG. 3 is a schematic diagram showing the optical path in the vicinity of the tip of the optical system shown in FIG. 2.

FIG. 3 shows schematically part of the objective lens unit 50 and the image guide 60 together with parallel rays of light that strike the objective lens unit 50 in four directions. In the viewing optical system 5 shown in FIG. 3, the light-receiving end 61 of the image guide 60 is positioned slightly behind the focal point of the objective lens unit 50 in order to obtain the highest resolution without compromising the quantity of light taken in.

Figure 4:
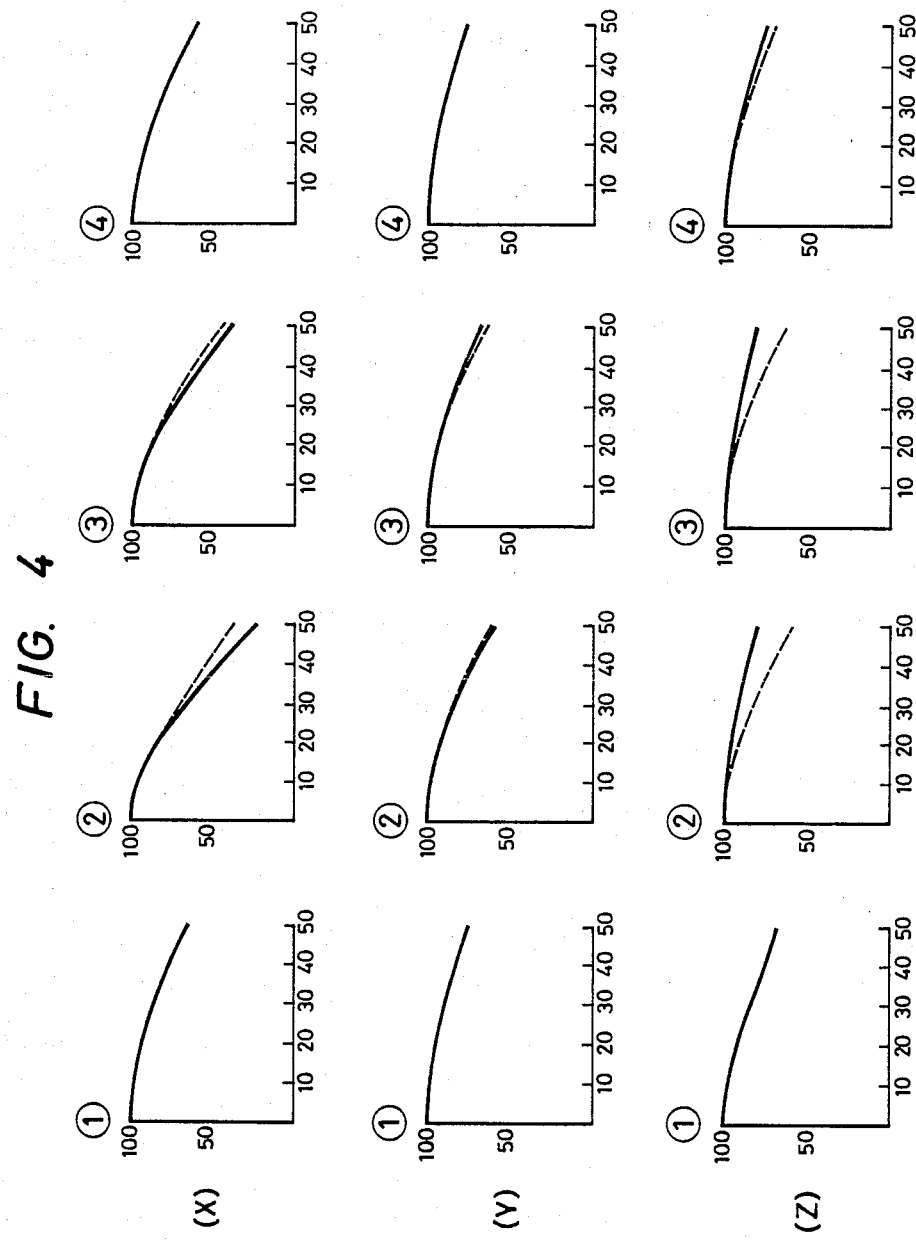
FIG. 4 is a set of graphs showing the OTF attained with the optical system shown in FIG. 2.

FIG. 4 shows the optical transfer function (OTF) of the viewing system 5 (measured under conditions to be described below). Each of the graphs in FIG. 4 shows the spatial frequency on the x-axis in units of line pairs per millimeter, with the y-axis plotting the contrast of an image on the image plane with the value for the object to be examined being taken as 100.

Graphs (1) to (4) in row (Y) show the OTF in a just-focused condition, graphs (1) to (4) in row (X) show the OTF in a front-focused condition (2/100 mm), and graphs (1) to (4) show the OTF in a rear-focused condition (2/100 mm). Graphs (1) to (4) in each row show the OTF at points 61a, 61b, 61c and 61d, respectively, on the light-receiving end 61 of the image guide 60 shown in FIG. 3.

The solid line in each graph denotes the contrast on a chart in the meridional direction, and the dashed line signified the contrast on a chart in the sagittal direction.

Since the individual optical fibers of which the image guide 60 is composed have a diameter of approximately 10 $\mu$m, it is desired that high contrast be preserved at 50 line pairs per millimeter.

As can be seen for the graphs in FIG. 4, the contrast of the produced image from the viewing optical system 5 is not decreased to any substantial degree in the high spatial frequency range. For example, the OTF at a spatial frequency of 50 line pairs per millimeter when the lowest contrast is attained in a just-focused state (see graph (Y) (2)) is 58% in the meridional direction and 61% in the sagittal direction. This ensures that a sharpness whose level does not cause any inconvenience for practical purposes can be obtained over the entire range of the visual field.

As a result, the endoscope 3 fitted with the viewing optical system 5 according to the present invention permits the overall length of the rigid part $A_1$ to be shortened while maintaining a high level of contrast for the image. Therefore, the direction of the tip 3a of the endoscope 3 can be changed with ease, even when it is inserted into a very small space, which contributes to a more efficient use of the endoscope by expanding the range of its applicable viewing angles.

Figure 5:
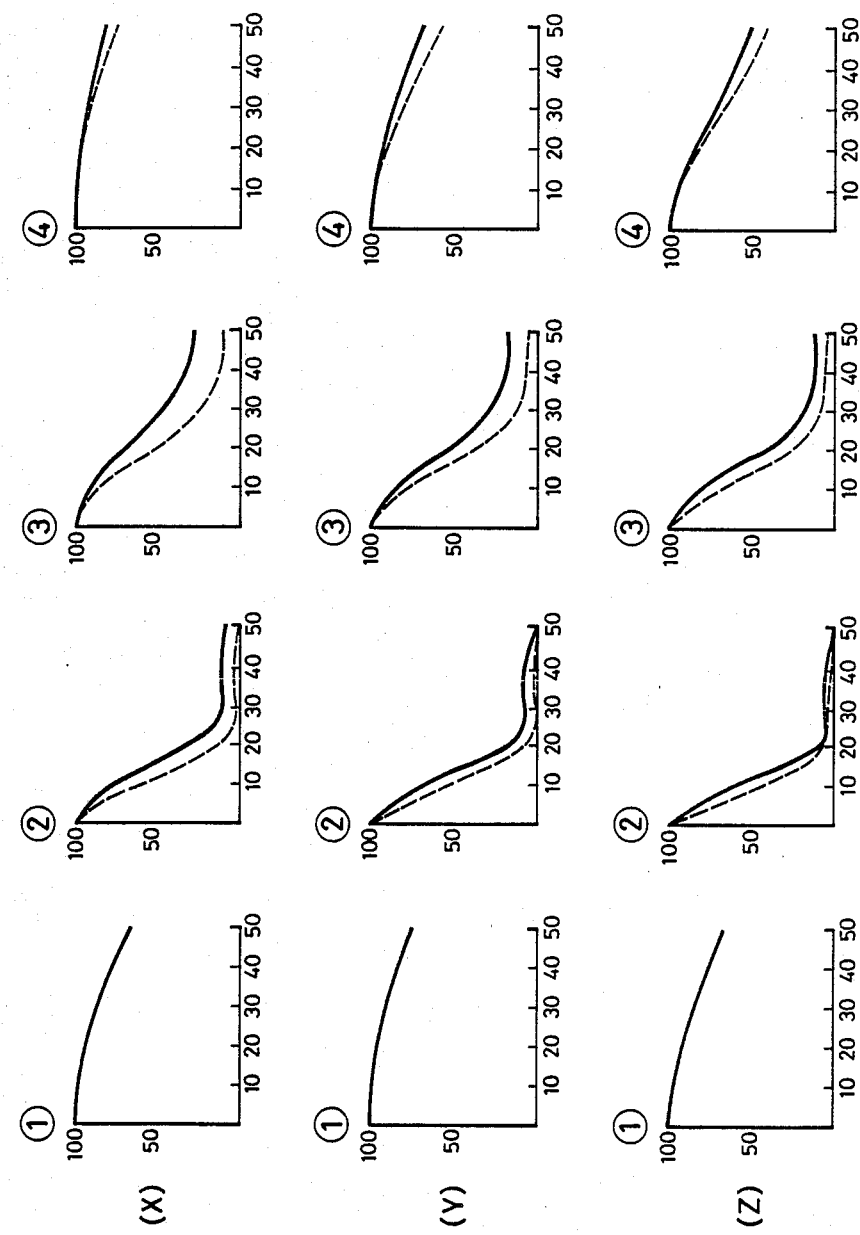
FIG. 5 is a set of graphs showing the OTF obtained with the optical system shown in FIG. 6.

In order to demonstrate the advantages of the present invention more clearly, the OTF attained in the case where the light-receiving end 61 of the image guide 6 is made to have a flat surface orthogonal to the optical axis of the objective lens unit 50 is shown in FIG. 5. Aside from the light-receiving end 61 having a flat surface, the optical system with which data in FIG. 5 was obtained has the same composition as the system of the present invention (see FIG. 6). The x- and y-axes in each graph as well as the conditions under which graphs (X), (Y) and (Z) or (1) to (4) were produced, are the same as for FIG. 4.

Figure 6:
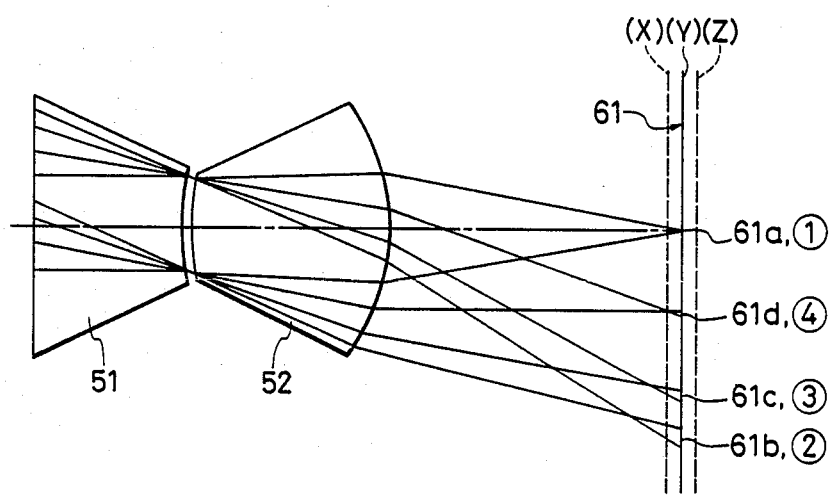
FIG. 6 is a schematic diagram showing the optical path in the vicinity of the tip of a viewing optical system in which the light-receiving end of an optical-fiber image guide is made to have a flat surface.

As is clearly evident from FIG. 5, the image produced from the viewing optical system shown in FIG. 6 experiences a drastic drop in contrast in the high spatial frequency range at a point further away from the optical axis of the objective lens unit 50. For example, the OTF at a spatial frequency of 50 line pairs per millimeter when the lowest contrast is obtained in a just-focused state (see graph (Y)(2)) is only 3% in the meridional direction and 1% in the sagittal direction. Obviously, such a low level of contrast is by no means acceptable in practical applications.

As described above, the viewing optical system for use with an endoscope of the present invention includes an objective lens unit forming curved image plane conjugate with an object plane and an optical-fiber image guide having one end surface curved to substantially conform to the image plane. With this arrangement the optical system of the present invention permits the use of a shorter rigid section for accomodating fewer lens elements in the objective lens unit and yet maintains the contrast of image attained at a high level.

As a further advantage, the direction of the tip of an endoscope equipped with this viewing optical system can be changed with ease even when it is inserted into a very small space, which contributes greatly to a more efficient use of the endoscope by expanding the range of its applicable viewing angles.

What is claimed is:

1. An endoscope viewing system consisting of in order, a rigid objective lens unit receiving light from an object to be examined under illumination, a flexible optical-fiber image guide transmitting the image of the object focused by said rigid objective lens unit on a light receiving end surface of said optical-fiber image guide, said optical-fiber image guide consisting of a multiplicity of optical fibers fixed in side-to-side, parallel fashion, and a rigid eyepiece for observing the image emerging from a light emerging surface at the opposite end of said image guide from said light-receiving surface, the improvement wherein;

said rigid objective lens unit consists of a first lens imaging a curved image plane conjugate with an object plane; and wherein the light-receiving end surface of the optical-fiber image guide is curved to substantially conform to said curved image plane of said rigid objective lens unit and is positioned at said image plane, such that all parts of said image are in focus at said light-receiving fiber image guide end surface permitting a sharp image of the object to be observed through said rigid eyepiece.

2. The endoscope viewing system as claimed in claim 1 wherein said objective lens unit consists of a concave lens element and a convex lens element, and the end of said optical-fiber image guide proximate to said convex lens element is concave shaped to conform to said convex lens element.

3. An endoscope viewing optical system comprising: an objective lens unit forming a curved image plane conjugate with an object plane; and an optical-fiber image guide consisting of a multiplicity of optical-fibers fixed in side-to-side, parallel fashion, said optical-fiber image guide having one end surface curved to substantially conform to said image plane, said curved end surface being positioned slightly behind said image plane.

* * * * *